Dec. 13, 1966   K. B. BEATTIE ETAL   3,290,989
COPYING CAMERA

Filed Feb. 1, 1965   5 Sheets-Sheet 1

INVENTORS
KENNETH B. BEATTIE
ROLAND P. BEATTIE II
ROBERT F. DeSANTIS

BY
ATTORNEY

INVENTORS
KENNETH B. BEATTIE
ROLAND P. BEATTIE II
ROBERT F. DeSANTIS

BY

ATTORNEY

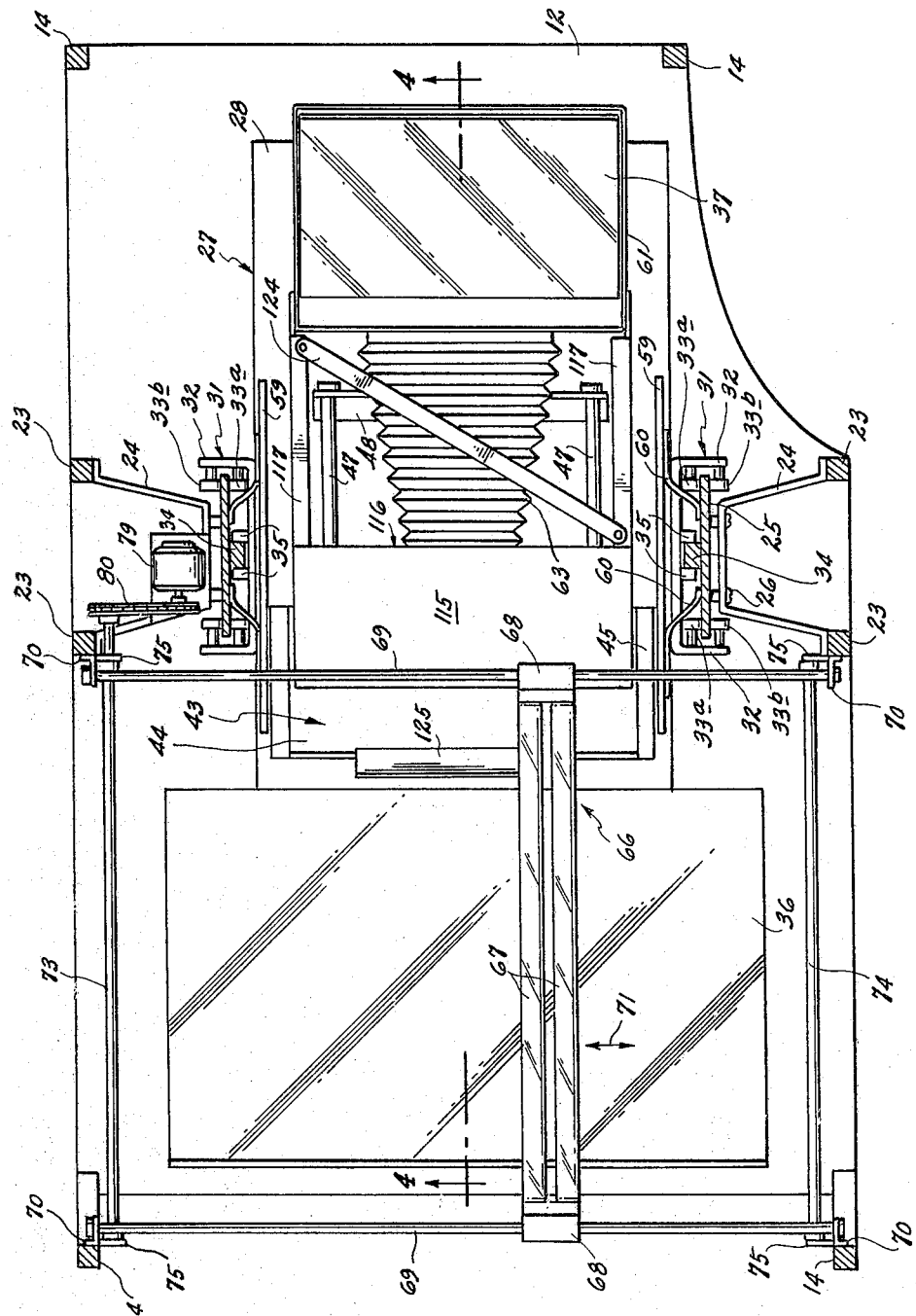

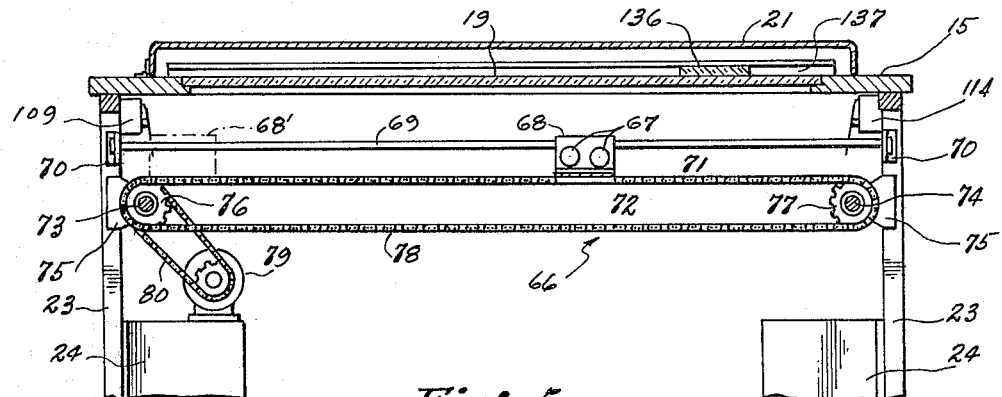
Fig. 5.
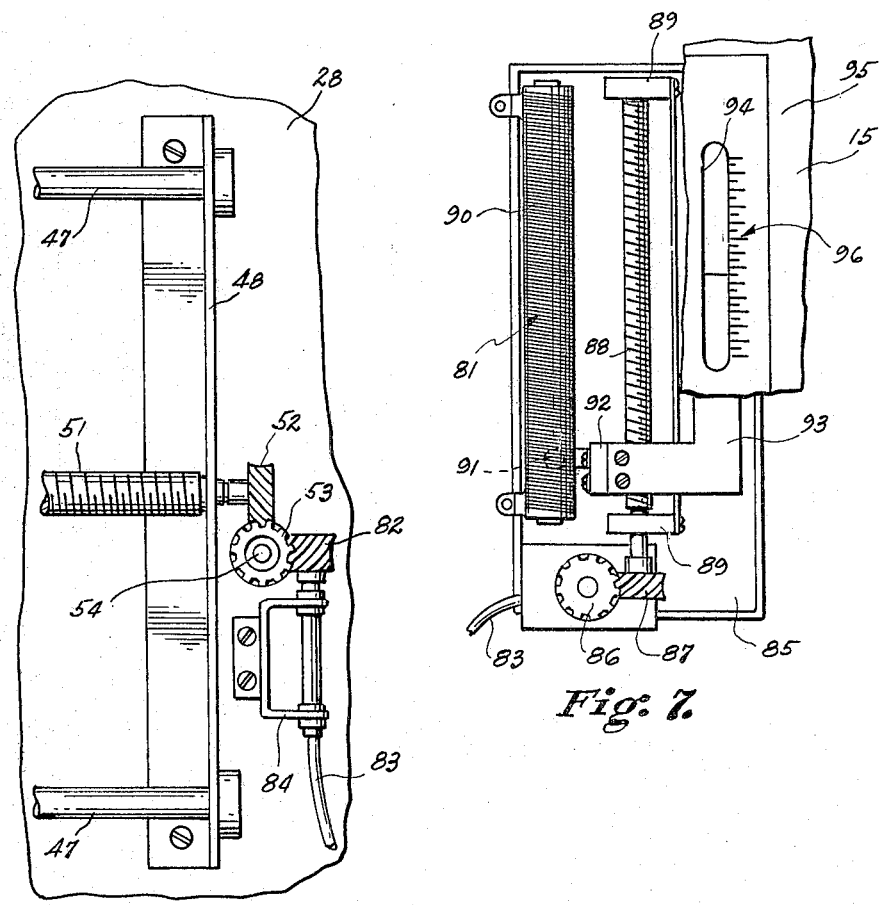
Fig. 6.
Fig. 7.
INVENTORS
KENNETH B. BEATTIE
ROLAND P. BEATTIE II
ROBERT F. DeSANTIS
BY
ATTORNEY INVENTORS
KENNETH B. BEATTIE
ROLAND P. BEATTIE II
ROBERT F. DeSANTIS

BY
ATTORNEY

United States Patent Office 3,290,989
Patented Dec. 13, 1966

3,290,989
COPYING CAMERA
Kenneth B. Beattie, Pottersville, Roland P. Beattie II, Madison, and Robert F. De Santis, Colonia, N.J., assignors to Kenro Corporation, Cedar Knolls, N.J., a corporation of New Jersey
Filed Feb. 1, 1965, Ser. No. 429,459
24 Claims. (Cl. 88—24)

This invention relates generally to photographic copying cameras, and more particularly is directed to a photographic copying camera suitable for use in making offset duplicating masters or plates, for example, of the type available under the trademark Ektalith from the Eastman Kodak Company.

Photographic copying cameras generally comprise a back or head for holding photosensitive material in the form of a film or plate, a copy board for supporting the copy or material to be photographed, an optical system for projecting an image of the copy onto the photosensitive material, with means being provided for varying the length of the light path through the optical system from the copy board to the back or head holding the photosensitive material thereby varying the size ratio or relationship of the copy to the image thereof focused onto the photosensitive material, and a lighting system for illuminating the copy so that the image thereof is formed by light reflected from the copy or material on the copy board.

In most existing cameras of the above type, the copy board and back or head for holding the photosensitive material are arranged in parallel planes which are either vertical or horizontal, and the optical system consists of an objective lens assembly arranged between the copy board and the back or head with its optical axis extending perpendicular to the planes of the copy board and the back or head. In these existing arrangements, a change in the length of the light path from the copy board to the back or head for varying the size relationship of the copy to the image thereof projected onto the photosensitive material requires a corresponding relative displacement of the copy board and head toward or away from each other. Where the camera is designed to make possible a substantial change in the size relationship, the necessity of providing for substantial relative displacements of the copy board and head results in a large and cumbersome structure and further causes difficulties in maintaining parallelism of their planes. Such large and cumbersome structures of the existing cameras are not adapted for use in business offices, and further are not suitable for use by relatively untrained personnel.

Accordingly, it is an object of this invention to provide a photographic copying camera, particularly suited for making offset plates or masters, for example, of the Ektalith type, and which is of compact arrangement and simple operation so as to be suited for use in business offices by relatively untrained personnel.

Another object is to provide a camera of the described character in which the necessary adjustments for changing the size relationship of the copy to the image projected onto the photosensitive material are all effected in a simple manner.

A further object is to provide an improved lighting system for uniformly illuminating the copy and thereby insuring the production of offset plates or masters of uniformly high quality.

In accordance with an aspect of this invention, a photographic copying camera comprises a stationary support member, which may be the top of a console or desk-like cabinet having two transparent portions arranged side-by-side and respectively adapted to support the copy and photosensitive sheet material, such as, an offset plate or master, an optical system movable vertically as a unit within the console and including two mirrors arranged respectively below the two transparent top portions and converging downwardly each at an angle of 45° from the horizontal, and an objective lens arranged with its optical axis extending horizontally between the two mirrors and being axially movable relative to the latter, size ratio adjusting means operative to effect vertical movement of the optical system, as a unit, and corresponding horizontal movement of the objective lens relative to the mirrors so as to vary the size ratio or relationship of the copy to the image thereof focused onto the photosensitive material, an assembly of elongated illuminating elements, for example, fluorescent lighting tubes, extending under the transparent top portion which supports the copy and being reciprocable horizontally at right angles to the direction in which the elongated illuminating elements extend, and drive means operative to effect reciprocation of the assembly of illuminating elements so as to achieve substantially uniform illumination of the image of the copy focused onto the photosensitive material.

A further object of the invention is to provide a photographic copying camera of the described character in which the light flux density of the image focused onto the photosensitive material is substantially constant for different size ratios or relations of the copy to the image thereof.

In accordance with an important feature of the invention, the desired uniform light flux density of the image is achieved by varying the speed at which the assembly of illuminating elements is reciprocated in accordance with changes in the size ratio or relation of the copy to the projected image.

In existing photographic copying cameras, the field of view of the objective lens frequently extends beyond the perimeter of the copy board, that is, the objective lens may view the interior of the camera and project an image or "ghost" thereof onto the photosensitive material around the image of the copy, particularly when the projected image is of reduced size relative to the copy. The projected image will also show any difference in tone between the sheet being copied and the "background" or white underside of the pressure plate holding the copy sheet on the copy board. When such a camera is used for directly making offset plates or masters, for example, of the Ektalith type, the plate or master cannot be conveniently reworked for removing the "ghost" image of the interior of the camera or the "background" appearing around the image of the desired copy. Even where the camera is not used for the direct production of offset masters or plates, reworking of the exposed photosensitive material for the purpose of removing the unwanted image or "ghost" view of the interior of the camera and of the "background" requires considerable skill and is a time consuming operation.

Accordingly, it is still another object of this invention to provide a photographic copying camera which avoids the projection of a visible "ghost" image of interior structure of the camera or of "background" onto the photosensitive material.

In accordance with another important feature of this invention, the projection of a "ghost" image onto the photosensitive material around the desired image of the copy is avoided by providing shielding means extending around the objective lens and having brightly illuminated surfaces coming within the field of view of the objective lens at least beyond the area of the transparent copy support so as to project a brightly illuminated area around the image of the copy focused in the plane of the photosensitive material. Preferably, illumination of the surfaces of the shielding means which come within the view of the objective lens is effected only when the objective lens is positioned to focus an image in the plane of the photosensitive material having a size ratio with respect to the copy which is smaller than a predetermined value, for example, a size ratio of less than 70%.

The above, and other objects, features and advantages of the invention, will be apparent in the following detailed description of an illustrative embodiment thereof which is to be read in connection with the accompanying drawings forming a part hereof and wherein:

FIG. 3 is a horizontal sectional view taken along the line 3—3 on FIG. 2;

FIG. 5 is a detail sectional view taken along the line 5—5 on FIG. 2, and particularly illustrating the copy illuminating system of the camera;

FIG. 6 is an enlarged detail sectional view taken along the line 6—6 on FIG. 4;

FIG. 7 is an enlarged detail view showing a size ratio indicator and part of an arrangement provided for ensuring uniform light flux density of the image in the camera embodying this invention;

Figure 1:
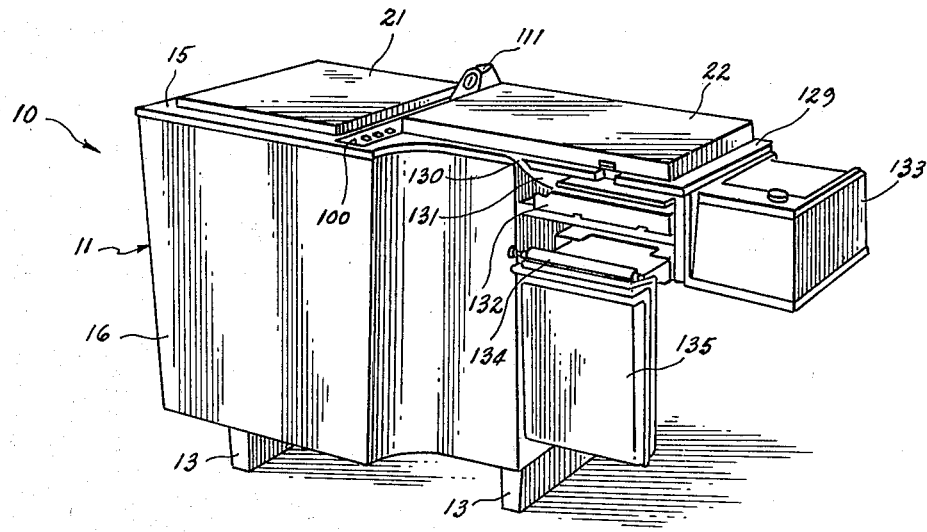
FIG. 1 is a perspective view of a photographic copying camera embodying the present invention, and which is particularly adapted for producing offset plates or masters of the Ektalith type.

Referring to the drawings in detail, and initially to FIG. 1 thereof, it will be seen that a photographic copying camera embodying this invention, and there generally identified by the reference numeral 10, includes a desk-like cabinet or console 11 having a base 12 (FIGS. 2 and 3) supported on suitable feet 13 (FIG. 1), a framework having upstanding corner posts 14 extending from base 12 and carrying a horizontal top or counter 15, and a casing or housing wall 16 (FIG. 1) extending between base 12 and top 15 to enclose the operating components of the camera.

The horizontal top or counter 15 has substantially rectangular, side-by-side arranged openings 17 and 18 therein, and plates 19 and 20 of glass or other transparent material are secured in openings 17 and 18 to form transparent portions of the top which respectively support the copy or material to be photographed and the photosensitive sheet material, for example, an offset plate or master. Lids 21 and 22 are hingedly mounted on top 15 adjacent the back edge of the latter and, when in their closed positions, as shown on FIGS. 1 and 2, respectively extend over transparent plates 19 and 20, thereby to cover the copy on plate 19 and the photosensitive material on plate 20 so that the camera can be operated in an illuminated room or office.

At the front and back of console 11, and approximately midway between the opposite ends thereof, there are pairs of spaced apart posts 23 also extending between base 12 and top 15 and forming part of the framework of the console. An outwardly opening channel member 24 extends upwardly from base 12 at the inside of each pair of posts 23 (FIGS. 2 and 3), and the upper ends of the channel members 24 terminate substantially below top or counter 15 (FIG. 5). An elongated vertical guide plate 25 is secured at the inside of each channel member 24, as by screws 26 (FIGS. 2 and 3) and is dimensioned so that its opposite longitudinal edge portions will project laterally beyond the inner portion of the adjacent channel member 24.

A frame 27 for the optical system of camera 10 is disposed between the vertical plates 25 and includes a horizontal, rectangular plate or floor 28 having flanges 29 depending from its opposite longitudinal edges and increasing in depth towards the center thereof. A lateral bracing member 30 (FIG. 4) extends between the lower portions of flanges 29, thereby providing the frame 27 with substantial rigidity. Brackets 31 are welded or otherwise secured on the outer surfaces of flanges 29 approximately midway between the opposite ends of frame 27. Each bracket 31 has outwardly directed flanges 32 extending along its opposite vertical edges, and the distance between flanges 32 of each bracket 31 is sufficiently large to permit the adjacent guide plate 25 to extend therebetween. Each flanges 32 of brackets 31 carries sets of rotatable rollers 33a and 33b which are in rolling contact with the longitudinal edge portions of the adjacent guide plate 25 at the inner and outer surfaces, respectively, of the latter. Frame 27 is further guided relative to the fixed guide plates 25 by means of vertical guide bars 34 projecting from the inner surface of the plates 25 along the longitudinal medial lines of the latter and each being slidably received between a pair of spaced apart guide bearing blocks 35 which extend outwardly from the central portion of the adjacent bracket 31.

It will be apparent that, by reason of the rolling contact of rollers 33a and 33b with the inner and outer surfaces of guide plates 25 and the sliding contact of guide blocks 35 with the vertical bars 34, frame 27 is accurately constrained to move vertically within console 11.

Figure 4:
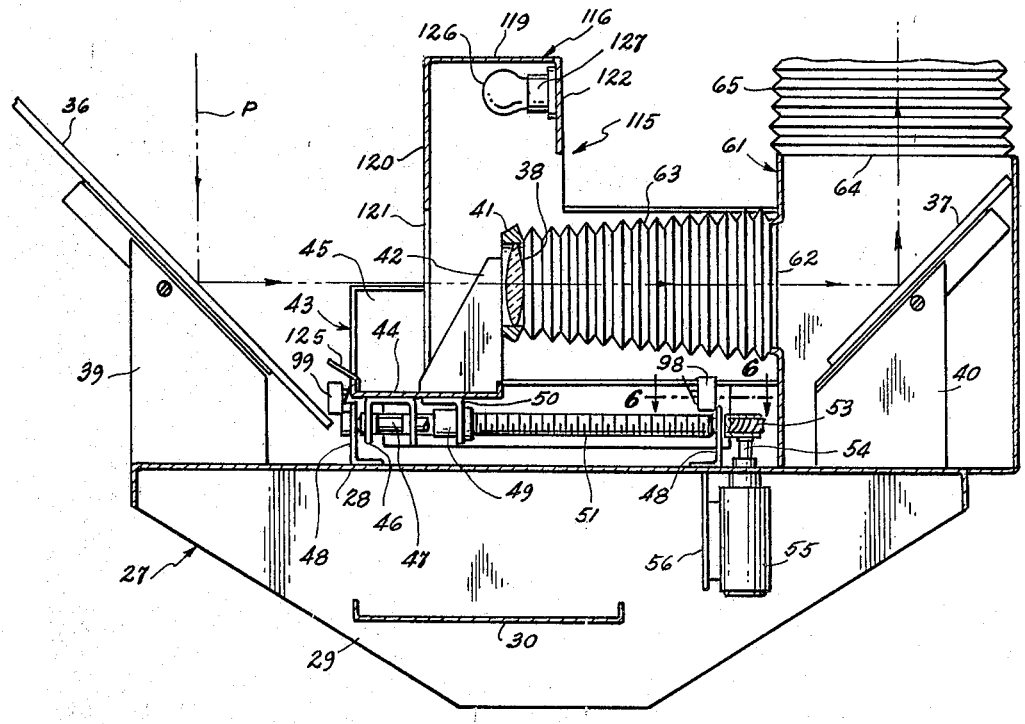
FIG. 4 is a vertical sectional view taken along the line 4—4 on FIG. 3.
Figure 2:
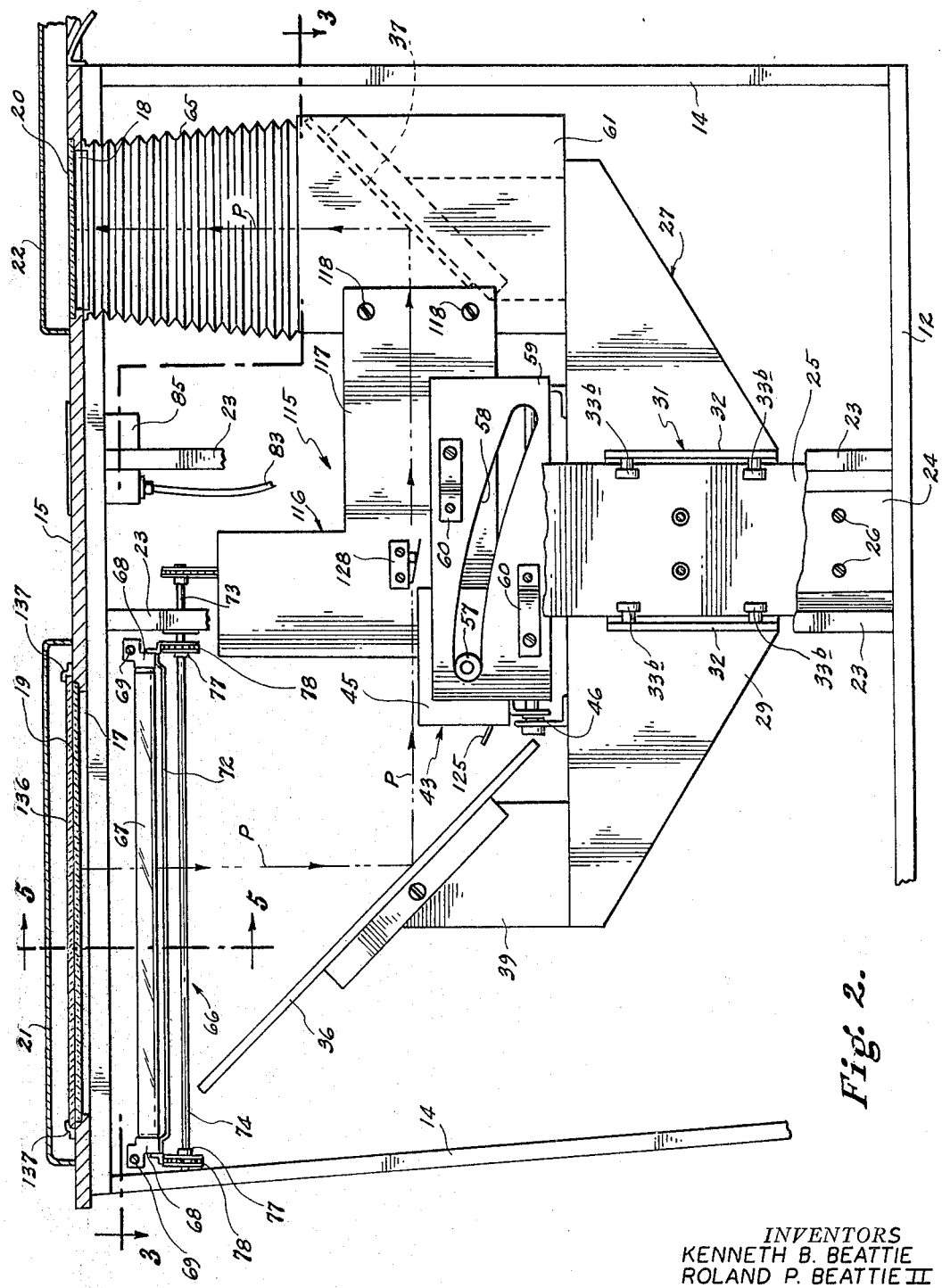
FIG. 2 is an enlarged front elevational view of the camera embodying this invention, but with its outer casing or housing removed and portions of its framework broken away.

The optical system of camera 10 is mounted on frame 27 for vertical movement with the latter and includes plane mirrors or reflectors 36 and 37 and an objective lens 38 (FIG. 4). The mirrors 36 and 37 are respectively mounted on brackets 39 and 40 extending upwardly from floor 28 of frame 27 adjacent the opposite ends of the latter so as to dispose mirror 36 under transparent plate 19 and mirror 37 under transparent plate 20. The mirrors 36 and 37 converge downwardly and are each disposed at an angle of 45° from the horizontal so that the optical system forms a light path P from copy on transparent plate 19 to photosensitive material on transparent plate 20 (FIG. 2).

Figure 8:
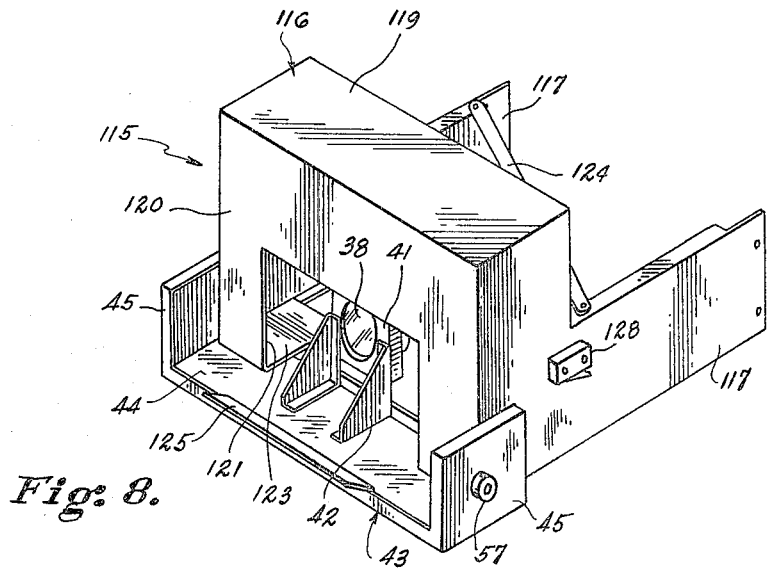
FIG. 8 is a perspective view of shielding means provided around the objective lens in the camera.

The objective lens 38 is secured in a mount 41 which is supported by a bracket 42 on a carriage 43 (FIGS. 4 and 8). As shown particularly on FIG. 8, carriage 43 includes a base portion 44 extending laterally over frame 27 and having upturned end portions 45. The base portion 44 of carriage 43 has depending bearings 46 which are slidable along parallel guide rods 47 (FIG. 4). The opposite ends of guide rods 47 are suitably secured in angle members 48 which are attached to the upper surface of floor 28 of the vertically movable frame 27 (FIGS. 3, 4 and 6). The guide rods 47 extend parallel to the portion of light path P between mirrors 36 and 37 so that movement of carriage 43 along guide rods 47 causes objective lens 38 to be displaced in the direction of its optical axis relative to mirrors 36 and 37.

In order to effect displacement of carriage 43 along guide rods 47, and thereby displace the objective lens relative to the mirrors, a nut member 49 is mounted in a bracket 50 extending from the underside of base portion 44 of the carriage (FIG. 4) and threadably receives an adjusting screw 51 which extends parallel to guide rods 47 approximately midway between the latter. The adjusting screw 51 has its opposite end portions journaled in angle members 48 and, as shown on FIG. 6, one end of the adjusting screw 51 carries a worm wheel 52. A worm 53 in meshing engagement with worm wheel 52 is secured on a motor shaft 54 extending upwardly through the floor 28 from a reversible electric motor 55 mounted on a bracket 56 under floor 28 of frame 27. Thus, when motor 55, which may be of the shaded pole type, is energized to drive its shaft 54 in one direction or the other, the corresponding rotation of screw 51 moves nut 49, and hence carriage 43, parallel to the axis of the adjusting screw, and thus displaces objective lens 38 in the direction of its optical axis.

It will be apparent that vertical movement of frame 27 toward and away from top or counter 15 is effective to respectively reduce or increase the length of the light path P by a distance equal to twice the distance through which the frame 27 is vertically displaced. Further, when horizontal movements of objective lens 38 are correlated with the vertical movements of frame 27, and hence of the optical system as a unit, the effect of the vertical movement of mirrors 36 and 37 and lens 38, as a unit, and of the horizontal movement of lens 38 between mirrors 36 and 37, will be to vary the size relation of the image focused by the lens in the plane of transparent plate 20 to the size of the copy on transparent plate 19. In order to correlate the horizontal movements of lens 38 with vertical movements of frame 27, the upturned end portions 45 of carriage 43 support freely rotatable cam follower rollers 57 (FIGS. 2 and 8) which engage in inclined arcuate cam slots 58 (FIG. 2) formed in stationary cam plates 59. The cam plates 59 are disposed in vertical plnaes spaced inwardly from guide plates 25 (FIG. 3) and are supported from the latter, as by brackets 60 (FIGS. 2 and 3) so as to be positioned above the top edges of brackets 31 in the highest position of vertically movable frame 27.

As is apparent on FIG. 2, the cam slots 58 slope downwardly in the direction from mirror 36 toward mirror 37 so that, as carriage 43 and objective lens 38 move toward mirror 37 from the position shown on FIGS. 2 and 4, frame 27, and hence both mirrors 36 and 37 and objective lens 38 are moved, as a unit, vertically downward to increase the length of light path P, and thereby reduce the size ratio of the image to the copy. Conversely, as lens 38 is moved toward mirror 36, frame 27, and hence mirrors 36 and 37 and lens 38 are moved vertically upward, as a unit, thereby to reduce the length of the light path and increase the size ratio, for example, up to a maximum 1:1 ratio. Further, the cam slots 58 are contoured so that the relationship of vertical movement of frame 27 to horizontal movement of carriage 43 causes objective lens 38 to accurately focus the image in the plane of transparent plate 20 for all size ratios or degrees of magnification or reduction.

The portion of light path P extending from lens 38 to the focal plane of the camera, that is, to the transparent plate 20 for supporting the photosensitive material is preferably shielded from external light. In the illustrated embodiment, such shielding is achieved by means of a light-tight casing 61 secured on frame 27 about mirror 37 and having an opening 62 at the side facing toward lens 38, and a light-tight bellows 63 extending from lens mount 41 to casing 61 around opening 62 of the latter. Further, casing 61 has an opening 64 at the top thereof, and a flexible bellows 65 extends from casing 61 around opening 64 at the top thereof to the underside of counter 15 around the opening 18 in the latter (FIGS. 2 and 4).

In order to illuminate the copy supported on transparent plate 19, the camera 10 further comprises a lighting system 66 (FIGS. 2, 3 and 5). In accordance with this invention, the lighting system 66 includes a plurality of elongated illuminating elements 67, for example, fluorescent lamps, which extend horizontally below transparent plate 19 and have their axes arranged parallel to each other. The elongated illuminating elements 67 are of sufficient length to extend completely across plate 19 and have their opposite ends supported in sockets or holders 68. The holders 68 are slidably supported on horizontal rods 69 extending at right angles to the axes of the illuminating element 67 and having their front and back ends secured in brackets 70 attached to posts 14 and 23 of the framework of the camera adjacent the top 15. Thus, the elongated illuminating elements 67 are mounted for horizontal reciprocation in directions at right angles to the axes of the illuminating elements, that is, in directions indicated by the double-headed arrows 71 on FIGS. 3 and 5.

An elongated opaque shield 72 extends immediately below illuminating elements 67 and is supported, at its opposite ends, by holders 68 to prevent light rays from passing directly downward from the illuminating elements into the optical system. Thus, as illuminating elements 67 are reciprocated in the direction of the arrows 71 to effect uniform illumination of the entire area of copy disposed on transparent plate 19, the image of the copy projected by the optical system is formed of light reflected therefrom.

In order to effect reciprocation of illuminating elements 67, lighting system 66 further includes shafts 73 and 74 extending laterally at the back and front, respectively, of console 11 and having their ends journalled in bearing brackets 75 suitably secured to posts 14 and 23 of the console framework. Shafts 73 and 74 have sprockets 76 and 77 secured thereon adjacent their opposite ends, and endless chains 78 (FIGS. 2 and 5) run around the sprockets 76 and 77 so as to have upper and lower horizontal runs disposed in vertical planes which pass substantially through the axes of the support rods 69. The upper runs of the chains 78 are suitably secured to the holders 68 so that, when shaft 73 is rotated in the clockwise direction, as viewed on FIG. 5, the assembly of holders 68 and illuminating elements 67 moves from an initial position indicated in broken lines at 68', and which is adjacent the back of the console in the direction toward the front of the latter. Conversely, when shaft 73 is rotated in the counterclockwise direction, the assembly of illuminating elements moves from the front toward the rear of the cabinet or console for return to its initial position. The selective rotation of shaft 73 in one direction or the other is effected by a reversible electric motor 79 (FIGS. 3 and 5) having its shaft connected to shaft 73 by way of a chain and sprocket transmission 80, and which may be suitably mounted on the upper end of channel member 24 at the rear of the console or cabinet. In accordance with the present invention, the reversible electric motor 79 is of a variable speed type, for example, a direct current variable speed motor, so that the speed of movement of illuminating elements 67 can be varied. Variation of the speed of movement alters the quantum of light illuminating the copy on transparent plate 19 during each reciprocation of the assembly of illuminating elements from the initial position at the back of the cabinet or console to the front of the latter and back to the initial position.

Further, in accordance with this invention, the speed at which illuminating elements 67 are driven by motor 79 is varied in accordance with changes in the size ratio of the projected image with respect to the copy so that, as the size ratio is reduced, that is, as the size of the image is made smaller, the speed of movement of the illuminating assembly is increased thereby to reduce the quantum of light illuminating the copy and to maintain a substantially uniform light flux density of the image.

In the illustrated embodiment of the invention, the speed of movement of illuminating elements 67 by motor 79 is controlled by means of a variable resistor 81 interposed in the energizing circuit for motor 79, as shown on FIG. 9 and which is hereinafter described in detail, and such variable resistor 81 is adjusted upon operation of motor 55 for varying the size ratio of the projected image to the copy. As shown particularly on FIG. 6, the worm 53 on shaft 54 of motor 55 also meshes with a worm wheel 82 secured to one end of a flexible cable transmission 83 which extends from a mounting or anchoring bracket 84 on floor 28 of frame 27 to a housing 85 which carries the variable resistor 81. The housing 85 is preferably suspended from the top or counter 15 of the console at a location between the transparent plates 19 and 20 (FIG. 2). As shown particularly on FIG. 7, the end of flexible transmission cable 83 remote from worm wheel 82 drives a worm 86 in meshing engagement with a worm wheel 87 at one end of a screw 88 which is journaled in bearings 89 within housing 85. The resistor 81 includes a coiled resistance wire 90 extending parallel to screw 88, and a movable tap 91 mounted on a traveler 92 having a tapped bore which threadably receives screw 88. As screw 88 is turned in one direction or the other in response to operation of motor 55, traveler 92 moves axially along screw 88 to similarly displace the movable tap 91 along the coiled resistance wire 90 of resistor 81 and thereby vary the value of the resistance interposed in series with motor 79.

As is shown particularly on FIG. 7, the traveler 92 further preferably carries an indicating element 93 having a portion which is movable longitudinally below an elongated slot 94 formed in a panel 95 which may form the top of housing 85 and which is exposed at the top surface of counter 15. A scale 96 is provided along slot 94 and is suitably calibrated to indicate, in cooperation with the portion of indicator 93 exposed at the slot 94, the size ratio of the projected image with respect to the copy for any particular position of the runner 92 along screw 88 which, in turn, depends upon the vertical and horizontal positions of frame 27 and carriage 43 determining the size ratio.

Figure 9:
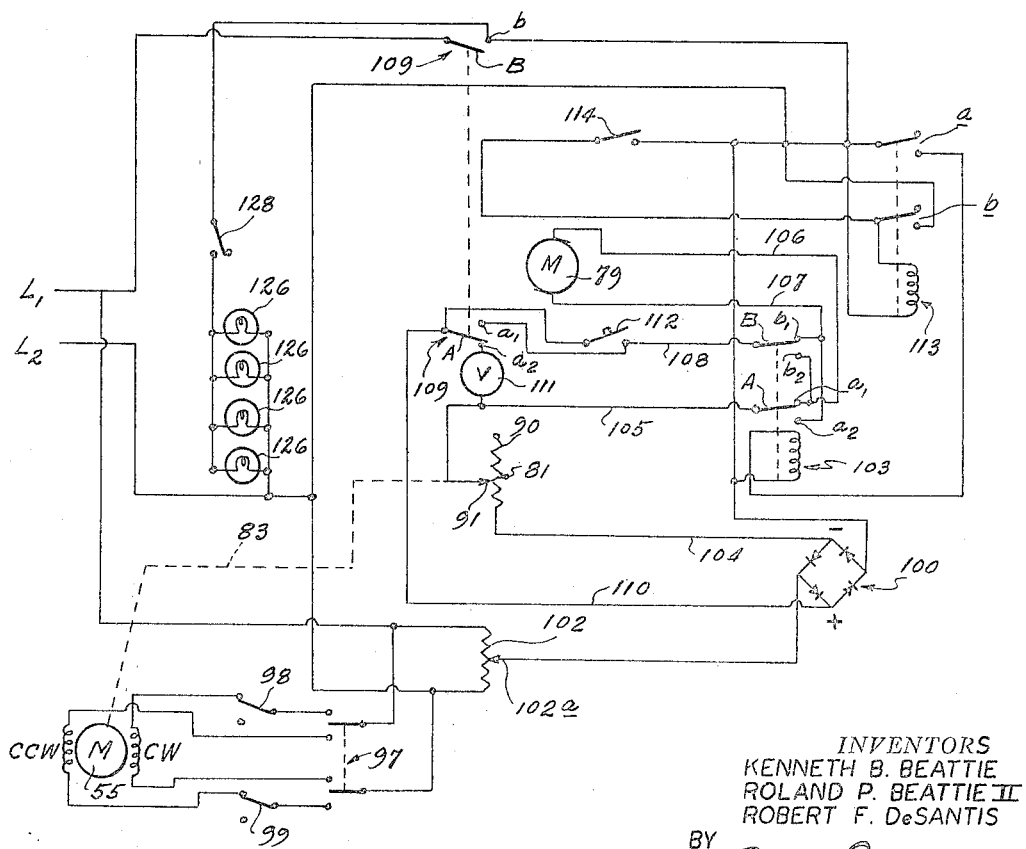
FIG. 9 is a diagrammatic view of electrical systems included in the camera.

Referring now to FIG. 9, it will be seen that the motor 55 has field coils CW and CCW intended to be alternatively energized for effecting clockwise and counterclockwise rotation, respectively, of the motor shaft 54. In order to permit control of the operation of motor 55, there is provided a manually operable rocker switch 97 which is shown in its normal open position rendering inoperative motor 55. When switch 97 is rocked in one direction, for example, upwardly from the position shown on FIG. 9, its contacts connect power supply lines $L_1$ and $L_2$ field coil CW through a normally closed limit switch 98, thereby to effect horizontal movement of the lens carriage 43 in one direction, for example, toward the right, as viewed on FIG. 4, and such movement of the carriage can continue until carriage 43 engages, and thus opens the contacts of limit switch 98 which may be mounted on one of the angle members 48 so as to extend into the path of travel of the lens carriage. When switch 97 is manually rocked in the opposite direction, for example, downwardly from the position shown on FIG. 9, rocker switch 97 completes the energizing circuit to field coil CCW of motor 55 through a normally closed limit switch 99 which, as shown on FIG. 4, may be mounted on the other angle member 48. Thus, downward rocking of rocker switch 97 is effective to cause movement of lens carriage 43 toward the left, as viewed on FIG. 4, and such movement of the lens carriage can continue until the latter engages and effects opening of the contacts of limit switch 99. The rocker switch 97 is preferably mounted so as to be manually operable at a control panel 100 (FIG. 1) provided on counter 15.

Referring again to FIG. 9, it will be seen that the direct current for operating motor 79 of the drive for the lighting system 66 is derived from a diode bridge 101 connected with the alternating current supply lines $L_1$ and $L_2$ by way of a resistance 102 having a movable intermediate tap 102a and acting as a variable voltage divider for regulating the voltage supplied to bridge 101. The direction of rotation of motor 79 is governed by a relay 103 which is shown in its normal or deenergized condition. Relay 103 has movable contacts A and B which engage fixed contacts $a_1$ and $b_1$, respectively, when the relay is deenergized, and which are moved to engage fixed contacts $a_2$ and $b_2$, respectively, when the relay is energized. As shown, a conductor 104 connects the negative terminal of bridge 100 with the resistance coil 90 of variable resistor 81, and a conductor 105 extends from the movable tap 91 of the variable resistor to the movable contact A of relay 103. Conductors 106 and 107 extend from the brushes of motor 79 to contacts $a_1$ and $b_2$ and to contacts $b_1$ and $a_2$, respectively, of relay 103. It will be apparent that, when relay 103 is deenergized, as shown, current passes from conductor 105 through engaged contacts A, $a_1$ to conductor 106 extending to one brush of motor 79 and returns from the other brush of the motor through conductor 107 and contacts $b_1$ and B of relay 103. On the other hand, when relay 103 is energized, as hereinafter described, current from conductor 105 passes through contacts A and $a_2$ into conductor 107 and returns from the motor 79 by way of conductor 106 and contacts $b_2$ and B.

A conductor 108 extends from movable contact B of relay 103 to a fixed contact $a_1$ of a limit switch 109. The limit switch 109 has a movable contact A alternately engageable with fixed contact $a_1$ or with another fixed contact $a_2$, and further includes a movable contact B engageable with a fixed contact $b$ and being movable simultaneously with contact A of the limit switch 109. Movable contact A of limit switch 109 is connected by way of a conductor 110 to the positive terminal of bridge 100, and a D.C. voltmeter 111 is connected between conductor 105 and fixed contact $a_2$ of limit switch 109. A normally open, push-button switch 112 which is preferably manually operable at the panel 100 is connected between conductors 108 and 110 for initiating the operation of lighting system 66.

As shown particularly on FIG. 5, the limit switch 109 is mounted adjacent the back end of one of the support rods 69 so as to be engageable by the holder indicated at 68' when the assembly of illuminating elements 67 is in its initial or rest position adjacent the rear of console 11. When the holder engages the actuating member of switch 109, the movable contacts A and B of the latter are positioned as shown on FIG. 9, that is, with the movable contact A engaging fixed contact $a_2$ and with the movable contact B spaced from fixed contact $b$. Thus, when the assembly of illuminating elements 67 is in its initial or rest position, the circuit for energizing motor 79 is interrupted, and contacts A and $a_2$ of switch 109 complete the circuit for voltmeter 111 which thereby indicates the voltage available for operation of motor 79 upon adjustment of variable resistor 81. If a voltage variation from lines $L_1$ and $L_2$ cause meter 11 to indicate a voltage for operation of motor 79 which is outside of prescribed limits, resistance 102 can be adjusted to return the meter reading to within such limits. Resistance 102 can also be adjusted to vary the voltage fed to motor 79, and hence the illumination of the copy, independent of the size ratio adjustment when the character of the emulsion of the photosensitive material changes or when the character of the copy is outside of normal limits.

When the push-button switch 112 is manually depressed, the described circuits for energizing motor 79 are initially completed so as to cause operation of that motor in the direction moving the assembly of illuminating elements 67 from the initial or rest position toward the front of console 11. Upon initial movement of the assembly of illuminating elements from the rest position, limit switch 109 is released and thereby moves its contacts A and B so as to engage fixed contacts $a_1$ and $b$, respectively. Thereafter, upon release of the manually operable push-button 112, the circuit for operating motor 79 is still completed through contacts A and $a_1$ of switch 109.

In order to energize the coil of relay 103, and thereby reverse the direction of movement of the assembly of illuminating element 67 when the latter reach the front of console 11, the circuits illustrated on FIG. 9 further include a relay 113 having its coil connected to power supply lines $L_1$ and $L_2$ in series with contacts B and $b$ of limit switch 109 and also in series with a normally open limit switch 114. As shown on FIG. 5, limit switch 114 is mounted adjacent the front end of one of the support rods 69 so as to be engaged by a holder 68 of the assembly of illuminating elements 67 when the latter approach the front of console 11. Engagement of limit switch 114 by a holder 68 closes the contacts of that limit switch and, since contacts B and *b* of switch 109 are closed at that time, the circuit for energizing relay 113 is thereby completed.

Relay 113 is shown to include normally open contacts *a* and *b* which are closed upon energizing of the coil of relay 113. Contacts *a* of relay 113 are connected in series with the coil of relay 103 so that relay 103 is energized to reverse the connections of motor 79, as described above, when relay 113 is energized in response to closing or actuation of limit switch 114. Contacts *b* of relay 113 constitute hold contacts for the latter so that, upon energization of relay 113 in response to actuation of limit switch 114, such energization of relay 113 is maintained until the assembly of illuminating elements 67 returns to its initial or rest position and thereby actuates limit switch 109 to open contacts B and *b* of the latter. Upon opening of contacts B and *b* of switch 109, the deenergization of relay 113 and the consequent deenergization of relay 103 returns the circuits to their initial conditions, as shown on FIG. 9.

It will be apparent that, during the forward and rearward movement of the assembly of illuminating elements 67 effected by the described circuits in response to manual depression of push-button switch 112, the speed of the movements produced by motor 79 will depend upon the adjustment of variable resistor 81 which, in turn, is dependent upon the previous adjustment of the size ratio effected by operation of the motor 55.

Referring now to FIGS. 2, 3, 4 and 8, it will be seen that the camera 10 embodying this invention further preferably has a shielding assembly 115 extending around objective lens 38. Shielding assembly 115 includes a housing 116 having L-shaped side walls 117 extending parallel to the direction of movement of lens 38 and lying in vertical planes just inside the upturned end portions 45 of lens carriage 43. The ends of the horizontally extending portions or legs of L-shaped side walls 117 are secured, as at 118 (FIG. 2) to casing 61 extending around mirror 37 on frame 27, so that housing 116 is fixed relative to frame 27 for vertical movement with the latter.

As shown particularly on FIG. 8, housing 116 further has a top wall 119 extending between the top edges of the upwardly directed legs or portions of L-shaped side walls 117, and an end wall 120 depending from top wall 118 between the end edges of side walls 117. End wall 120 has a rectangular cutout 121 in the lower portion thereof to permit lens 38 to view the copy on transparent plate 19 through mirror 36. End wall 120 defines vertical surfaces facing toward lens 38 at the opposite sides and across the top of cutout 121.

Housing 116 also has a depending vertical flange or short wall 122 (FIG. 4) extending from the lateral edge of top wall 118 remote from end wall 120, and horizontal wall sections 123 extending from the lower edge of end wall 120 at opposite sides of cutout 121 (FIG. 8). A brace 124 extends diagonally between side walls 117 so as to further strengthen the housing 116 (FIGS. 3 and 8).

It will be seen that, as carriage 43 is moved horizontally relative to frame 27 during adjustment of the size ratio, objective lens 38 moves similarly with respect to housing 116 and thereby varies the extent to which the inner surfaces of housing 116, and particularly of the walls 117, 120 and 123, come within the field of view of the objective lens. Framing of the view of the lens 38 through opening or cutout 121, particularly at the bottom of the latter, is completed by an inclined elongated member 125 extending upwardly from the base portion 44 of carriage 43 (FIGS. 2, 3, 4 and 8).

Lamps 126 (FIG. 4) are mounted in suitable sockets 127 carried by the flange 122 of housing 116 so that the lamps 126 are disposed within the housing immediately below top wall 119 of the latter. The inner surfaces of housing 116 and the upper surface of member 125 are painted white or otherwise provided with a reflective finish so that, when lamps 126 are energized, the surfaces of housing 116 and member 125 which project into the field of view of lens 38 will appear as an intensely illuminated area extending around the image of the copy projected in the plane of the photosensitive material on transparent plate 20.

Preferably, in accordance with this invention, lamps 126 are illuminated only when the camera is adjusted, as previously described herein, so as to provide a reduced size ratio, for example, a reduction to at least 70% of the size of the image with respect to the size of the copy.

As shown on FIG. 9, the above described control of the operation of lamps 126 is achieved by connecting such lamps in parallel to supply lines $L_1$ and $L_2$ by way of a normally open limit switch 128 which is connected in series with the contacts B and *b* of switch 109. As shown on FIG. 2, limit switch 128 is suitably mounted on a side wall 117 of housing 116 so that its actuating member is disposed in the path of travel of the adjacent upturned end portions 45 of lens carriage 43 as the latter moves in the direction for reducing the size ratio of the image with respect to the copy. Thus, when carriage 43 is displaced toward the right from the position shown on FIG. 2 and disposes the lens for a reduction of at least 70%, switch 128 has its contacts closed. Such closing of the contacts of switch 128 completes the circuit for energizing lamps 126 upon closing of contacts B and *b* of switch 109 during movement of the assembly of illuminating element 67 away from and back to its initial or rest position. As lens 38 is moved to effect greater reduction of the size ratio of the image with respect to the copy, end portion 45 of carriage 43 continues to engage switch 128, and the movement of the lens relative to housing 116 brings greater portions of the illuminated surfaces of housing 116 into the field of view of the lens, and thereby increases the size of the intensely illuminated area and causes the latter to close in around the image focused in the plane of transparent member 20.

The presence of such intensely illuminated area around the projected image of the copy ensures that "ghost" images of the internal structure of the camera and of the "background" will not appear around the copy image on the exposed photosensitive material. The foregoing feature of the camera 10 is particularly advantageous when the camera is employed for directly producing offset masters or plates, for example, of the Ektalith type, in which case, the plate or master cannot be conveniently reworked for removing the "ghost" image or "background."

Where the camera 10 embodying this invention is intended to be employed for the direct production of offset plates or masters of the Ektalith type, an extension table 129 may project horizontally at the level of the counter 15 from the end of console 11 closest to the transparent plate 20 (FIG. 1). The lid 22 for covering the transparent plate 20 may also extend over the table 129 to form a magazine adapted to hold a stack of the sheets of photosensitive material from which the offset masters or plates are produced. The forward edge of lid 122 is elevated with respect to the upper surfaces of table 129 and counter 15 so that one sheet at a time can be slidably removed from the bottom of the stack and displaced laterally therefrom onto transparent plate 20 while being continuously shielded from ambient illumination by the lid or cover 22. After the sheet of photosensitive material has been exposed to the illuminated image of the copy projected into the plane of transparent plate 20, the exposed material is again displaced laterally under lid 22 and passed downwardly, through a slot 130 between table 129 and the adjacent end of counter 15, and along a guide chute 131 into a processing tray 132 mounted below table 129. Tray 132 contains developing or processing chemicals which are maintained at a substantially constant level in the tray by periodic supply of the chemicals from a reservoir 133. After developing of the exposed offset plate or master, the latter is removed from tray 132 and passed through rollers 134 for removing excess moisture therefrom, and the removed moisture drips into an underlying receptacle or tank 135.

The above described components for developing the same after exposure in the camera 10 are commercially available from the Eastman Kodak Company and do not form parts of the present invention. However, the arrangement of the camera 10 embodying this invention which permits the placement of the copy and photosensitive material on side-by-side transparent portions of a horizontal counter or surface at a desk-height level makes such camera ideally suited for the attachment thereto of the developing components in the convenient positions illustrated on FIG. 1 and described above.

When the offset plates or masters, or other photosensitive sheet materials, are of uniform size and it is desired to position the head of the copy image at a fixed location relative to the head of the photosensitive material, irrespective of changes in the copy size and in the size ratio of the image to the copy, the camera 10 embodying this invention is further provided with a guide bar 136 (FIGS. 2 and 5) extending laterally over transparent plate 19 and having its ends slidably mounted, for example, in tracks 137, so as to be adjustable forwardly and rearwardly. A suitable scale (not shown) is provided on one or both of tracks 137 and is calibrated according to size ratio. When the size ratio of the image to the copy is adjusted, as previously described herein, the guide bar 136 is manually moved to the corresponding position indicated by the scale or scales. With the guide bar 136 thus adjusted and the head or upper edge of the copy located against the guide bar, the head edge of the projected image will appear at a predetermined location in relation to the head of the photosensitive sheet material suitably positioned on transparent plate 20. The guide bar 136 preferably has another scale (not shown) extending therealong for use in laterally centering the copy on plate 19.

In order that an image of the guide bar 136 will not appear on the photosensitive material, the bar 136 is preferably formed of a transparent plastic material, such as, methyl methacrylate, having white pigment dispersed therein.

Although an illustrative embodiment of this invention has been described in detail herein with reference to the accompanying drawings, it is to be understood that the invention is not limited to that precise embodiment, and that various changes and modifications may be effected by one skilled in the art without departing from the scope or spirit of the invention, except as defined in the appended claims.

What is claimed is:

1. A copying camera comprising
a stationary support member carrying first and second horizontal transparent plates adapted to support copy and photosensitive sheet material, respectively;
an optical system including first and second plane mirrors arranged below said first and second transparent plates, respectively, and converging downwardly each at an angle of forty-five degrees from the horizontal, and an objective lens arranged between said mirrors and having its optical axis extending horizontally;
a frame carrying said mirrors and being vertically movable to vary the length of the light path from said first plate to said second plate;
a carriage mounting said objective lens on said frame and being movable horizontally relative to the latter for focusing an image of copy on said first plate in the plane of said second plate;
size ratio adjusting means operative to effect corresponding simultaneous horizontal and vertical movements of said carriage relative to said frame and of said frame relative to said stationary support member, respectively, so as to vary the ratio of the size of the image focused at said second plate to the size of the copy on said first plate;
an assembly of elongated illuminating elements extending across said first plate below the latter and being reciprocable horizontally at right angles to the direction in which said illuminating elements extend; and
drive means operative to effect reciprocation of said assembly of illuminating elements for illuminating the entire area of copy on said first plate during exposure of photosensitive material on said second plate.

2. A copying camera as in claim 1;
further comprising means to vary the speed at which said assembly of illuminating elements is reciprocated by said drive means in response to operation of said size ratio adjusting means so as to obtain uniform intensity of illumination of the image focused in the plane of said second plate for various size ratios of the image with respect to the copy.

3. A copying camera as in claim 1; wherein said size ratio adjusting means includes relatively displaceable mechanical elements for determining the horizontal positioning of said carriage relative to said frame and the vertical positioning of said frame relative to said support member, and reversible means operative to effect relative displacement of said mechanical elements; and
wherein said drive means for reciprocating the assembly of illuminating elements includes a variable speed electric motor, electric circuit means for energizing said motor and having a variable resistor interposed therein which is adjustable to vary the speed of said motor and, hence, the speed at which the assembly of illuminating elements is reciprocated, and means automatically adjusting said variable resistor in response to operation of said reversible means for effecting relative displacement of said mechanical elements so that the speed of reciprocation of said assembly of illuminating elements is increased as the ratio of the size of the image to the size of the copy is decreased.

4. A copying camera as in claim 1; wherein said assembly of elongated illuminating elements includes at least one fluorescent lighting tube, holders supporting said tube at the ends of the latter, an elongated shield suspended from said holders and extending below said tube and parallel rods extending below said support member at the opposite sides of said first plate, said holders being slidable along said rods; and
wherein said drive means includes rotatable shafts extending laterally with respect to said rods adjacent the opposite ends of the latter, sprockets fixed on said shafts, chains running around said sprockets and having runs parallel to said rods, means connecting each of said holders to a run of the adjacent chain, a reversible electric motor, transmission means connecting said motor to one of said shafts, electric circuit means for operating said motor and having reversing means therein, manually operable switch means for initiating operation of said motor by said circuit means so as to drive said assembly of illuminating elements from an initial position adjacent one of said shafts toward the other of said shafts, reversing limit switch means adjacent said other shaft and actuable by said assembly to operate said reversing means and thereby reverse the direction of movement of said assembly, and stop limit switch means disposed adjacent said initial position of the assembly and engageable by the latter upon return thereof to said initial position for halting further operation of said motor.

5. A copying camera as in claim 4; further comprising a variable resistor interposed in said electric circuit means for controlling the operating speed of said motor, and means adjusting said variable resistor upon operation of said size ratio adjusting means in the sense for maintaining uniform light flux density in said image for various size ratios of the image with respect to the copy.

6. A copying camera as in claim 1;
further comprising shielding means extending around said objective lens and means for illuminating surfaces of said shielding means coming within the field of view of said objective lens at least beyond the area of said first plate so as to project a brightly illuminated area around the image of the copy focused in the plane of said second plate.

7. A copying camera as in claim 6; wherein said shielding means is fixed relative to said frame so that said objective lens is displaced with respect to said shielding means in response to adjustment of the size ratio of the projected image of the copy.

8. A copying camera as in claim 7;
wherein said means for illuminating surfaces of the shielding means includes lamps and electrical circuit means operative to energize said lamps only when said frame and carriage carrying the mirrors and objective lens, respectively, are disposed to project an image in said plane of the second plate having a size ratio with respect to the copy which is smaller than a predetermined value.

9. A copying camera as in claim 8; wherein said predetermined value of size ratio is 70%.

10. A copying camera as in claim 8; wherein said electrical circuit means includes normally open switch means fixed relative to said frame, and switch actuating means movable with said carriage to close said switch means and thereby cause energization of the lamps when said carriage is disposed relative to said frame to cause said lens to focus an image having a size ratio smaller than said predetermined value.

11. A copying camera as in claim 1; further comprising stationary vertical tracks at the opposite sides of said frame, rollers mounted at said sides of the frame and engaging the adjacent tracks for guiding the vertical movements of said frames, cam members in fixed positions relative to said vertical tracks, and cam follower rollers mounted on said carriage and engaging said cam members to move said frame vertically in response to horizontal movement of said carriage relative to said frame.

12. A copying camera as in claim 11; wherein said size ratio adjusting means includes an adjusting screw rotatably mounted on said frame and extending parallel to the direction of the horizontal movement of said carriage relative to the frame, nut means fixed to said carriage and threadably engaged by said screw so that rotation of the screw causes movement of said carriage, a reversible adjusting motor carried by said frame, and transmission means driven by said reversible adjusting motor for rotating said screw.

13. A copying camera as in claim 12; wherein said drive means for reciprocating the assembly of illuminating elements includes a variable speed electric drive motor, electric circuit means for operating said drive motor and having a variable resistor interposed therein which is adjustable to vary the speed of said motor and, hence, the speed at which said assembly is reciprocated, and means driven by said adjusting motor to adjust said variable resistor upon operation of said size ratio adjusting means in the sense maintaining substantially uniform light flux density of the projected image for various size ratios.

14. In a copying camera, the combination of a copy board, a support for photosensitive sheet material, an adjustable optical system for projecting, in the plane of the support, an image of copy on the board, means for adjusting said optical system to vary the size ratio between the copy and said image projected in the plane of said support, elongated illuminating means extending across said copy board and being reciprocable parallel to the board at right angles to the direction in which said illuminating means extends, drive means operative to reciprocate said illuminating means from an initial position at one side of said board to the opposite side of the latter and then back to said initial position for illuminating the entire area of copy on said board, adjustable control means for determining the speed at which said drive means reciprocates said illuminating means, and actuating means adjusting said control means in response to adjustment of said optical system so as to vary said speed at which said illuminating means is reciprocated and thereby achieve a uniform light flux density of the projected image for varying size ratios of the latter with respect to the copy.

15. In a copying camera, the combination as in claim 14; further comprising a guide bar extending laterally across said copy board and being adjustable over said copy board in directions at right angles to the extent of the guide bar to vary the position of the head edge of copy engaged with the adjusted guide bar so that the corresponding head edge of the projected image occupies a predetermined position relative to the photo-sensitive sheet material for all size ratios.

16. In a copying camera, the combination as in claim 14; wherein said optical system includes an objective lens which is movable for focusing, in the plane of said support, images having different size ratios with respect to the copy; and
further comprising shielding means having surfaces coming within the field of view of said lens at least beyond the area of said copy board, and means for illuminating said surfaces of the shielding means to cause a brightly illuminated area to be projected around the image of the copy focused in the plane of said support for photosensitive material.

17. In a copying camera, the combination as in claim 16; wherein said means for illuminating surfaces of the shielding means includes control means sensitive to the position of said lens to cause illumination of said surfaces only when the projected image has a size ratio with respect to the copy which is smaller than a predetermined value.

18. In a copying camera, the combination as in claim 14; wherein said means for adjusting the optical system includes an adjusting motor operative to effect said adjustment of the optical system; and
wherein said drive means for reciprocating said illuminating means includes a variable speed drive motor and electric circuit means for operating the latter, said control means for determining the speed at which said drive means reciprocates the illuminating means includes a variable resistor interposed in said electric circuit means for the drive motor and said actuating means is operated by said adjusting motor to correspondingly adjust said variable resistor.

19. In a copying camera, the combination as in claim 18;
further comprising size ratio indicator means adjusted simultaneously with said variable resistor by said actuating means.

20. In a copying camera, the combination as in claim 18;
further comprising a manually actuated variable resistor for varying the voltage available to operate said drive motor.

21. In a copying camera, the combination of a copy board, a support for photosensitive material, an adjustable optical system defining a variable length light path from said board to said support and including an objective lens which is displaceable in correspondence with variations of said length of the light path for focusing, in the plane of said support, an image of copy on said board, shielding means extending around said objective lens, and means for illuminating surfaces of said shielding means coming within the field of view of said lens at least beyond the area of said copy board, thereby to cause a brightly illuminated area to be projected around the image of the copy focused in the plane of said support for photosensitive material.

22. In a copying camera, the combination as in claim 21;
- wherein said means for illuminating surfaces of said shielding means includes control means sensitive to the position of said lens to cause illumination of said surfaces only when the projected image has a size ratio with respect to the copy which is smaller than a predetermined value.

23. In a copying camera, the combination as in claim 21;
- wherein said shielding means includes a housing extending around said objective lens and having the latter movable axially relative thereto, and said surfaces of the shielding means are defined by walls of said housing extending in planes perpendicular and parallel, respectively, to the axis of said lens.

24. In a copying camera, the combination as in claim 23;
- wherein said means for illuminating said surfaces of the shielding means includes lamps disposed in said housing outside of said field of view of the lens.

References Cited by the Examiner
UNITED STATES PATENTS 2,431,612  11/1947  Furnas _____ 88—24
2,487,066  11/1949  Moen _____ 88—24

NORTON ANSHER, *Primary Examiner.*
R. A. WINTERCORN, *Assistant Examiner.*